United States Patent [19]

Hammer et al.

[11] 4,097,963

[45] Jul. 4, 1978

[54] SHAPED ARTICLE COMPRISING CELLULOSE HYDRATE WHICH IS CHEMICALLY MODIFIED BY POLYALKYLENE OXIDE CONTAINING SYNTHETIC POLYMERS, AND PREPARATION THEREOF

[75] Inventors: Klaus-Dieter Hammer, Mainz; Günter Gerigk, Oberursel; Lorenz Heiss, Hofheim; Klaus Fischer, Kelkheim, all of Fed. Rep. of Germany

[73] Assignee: Hoechst Aktiengesellschaft, Frankfurt am Main, Fed. Rep. of Germany

[21] Appl. No.: 826,131

[22] Filed: Aug. 19, 1977

[30] Foreign Application Priority Data

Aug. 20, 1976 [DE] Fed. Rep. of Germany ....... 2637510

[51] Int. Cl.² .................... A22C 21/00; F16L 11/00; C08L 1/10; A23G 1/00
[52] U.S. Cl. .................................. 17/49; 138/118.1; 260/13; 264/188; 426/105; 426/135; 426/413; 427/230; 427/324; 427/336; 427/385 B; 428/36; 536/30; 536/31
[58] Field of Search ................ 428/36, 413, 532, 533, 428/534; 426/105, 135, 129, 413, 414, 420; 427/385 B, 336, 324, 230; 260/13; 536/30, 31; 17/49; 138/118.1; 264/188

[56] References Cited

U.S. PATENT DOCUMENTS

| 2,866,710 | 12/1958 | Dowd .................... 428/36 |
| 3,009,831 | 11/1961 | Wilfinger ................ 428/532 |
| 3,656,993 | 4/1972 | Edwards et al. .......... 427/324 |
| 3,872,196 | 3/1975 | Bridgeford ............. 264/188 |
| 3,912,839 | 10/1975 | Ramagopal ............. 427/324 |
| 3,917,894 | 11/1975 | Coleman ................ 428/532 |

*Primary Examiner*—William R. Dixon, Jr.
*Attorney, Agent, or Firm*—Richard L. Schwaab

[57] ABSTRACT

A shaped article, especially a tube-shaped article, including a chemically modified cellulose hydrate and water which comprises:

(a) a chemically modified cellulose hydrate which comprises a reaction product obtainable by reacting a cellulose derivative selected from the group consisting of a cellulose hydrate, a chemical reaction product of a cellulose hydrate with an alkylamido-bis-dimethylene-triazinone-tetramethylol, a chemical reaction product of a cellulose hydrate with an alkylamino-bis-dimethylene-triazinone-tetramethylol and mixtures thereof, with a synthetic polymer containing recurring oxyalkylene units and at least one terminal group having the formula —$CH_2$—O—CO—NH—$CH_2$—OH and (b) water, is disclosed. Such articles can be prepared by treating a shaped article wherein the cellulose derivative is in the gel state with a solution of the synthetic polymer prior to drying the article under heating. Tube-shaped articles are particularly suited as sausage casings.

60 Claims, 3 Drawing Figures

SHAPED ARTICLE COMPRISING CELLULOSE HYDRATE WHICH IS CHEMICALLY MODIFIED BY POLYALKYLENE OXIDE CONTAINING SYNTHETIC POLYMERS, AND PREPARATION THEREOF

BACKGROUND OF THE INVENTION

The invention relates to shaped article, especially packaging material, preferably films and particularly preferentially tubes, comprising a cellulose hydrate which has been partially chemically modified by partial chemical reaction with a synthetic reactive polymer comprising a modified polyalkylene oxide, which is capable of reacting with the OH groups in the cellulose hydrate.

The invention also relates to tubular casings having the above chemical structure which are useful as synthetic sausage casings.

The invention also pertains to a process for preparing the above described shaped articles.

Shaped articles of cellulose hydrate, and especially packaging material, can be burnt after use without problems and are also advantageous because they undergo bacterial decomposition relatively rapidly.

A further advantage of shaped articles which are made of a material of the said type is that certain properties of the material change in a desirable manner during its proper use, for example, as a packaging material. This change in properties of cellulose hydrate films, which comprises shrinkage as a result of the loss of water and/or plasticizer, is especially important when the films are used as sausage casings, because it is necessary for the sausage casings to fit the shrinking sausage material so that plump sausages of appetizing appearance are always supplied. Because of their inert properties, sausage casings which are made of synthetic polymers, such as polyamide, polyester, polyvinylidene chloride or the like, do not sufficiently exhibit these advantageous characteristics. Sausage casings of which are made of the said polymers therefore, frequently have an undesirable wrinkled and unappetizing appearance and are therefore unsellable.

The properties and structure of the cellulose hydrate which forms the shaped article can be varied within wide limits by varying the properties and the composition of the viscose, the average degree of polymerization, the spinning and drying conditions during the manufacture of the shaped articles and the plasticizer content thereof.

It has also been proposed to improve the suppleness of plasticizer-free cellulose hydrate by adding fat-like chemical substances which are capable of crosslinking.

However, it has hitherto not yet been possible to completely prevent, or even only adequately restrict, the very large changes in the structure and the properties of the cellulose hydrate, which forms the shaped article, which arise during their proper use, especially on soaking in water and/or drying of the shaped articles, especially tube-shaped articles, for use as a synthetic sausage casing, as a result of a substantial loss of their content of chemical plasticizer.

In the case of synthetic sausage casings based on cellulose hydrate which has been plasticized with a secondary chemical plasticizer, and which have a water vapor-impermeable coating of polymeric material on their inner side, too high of an internal pressure results in the sausage after the loss of the secondary chemical plasticizer in the casing because of the severe shrinkage of the sausage casing which is caused thereby. Due to the embrittlement of the sausage casing which has occured as a result of the loss of plasticizer, there is then a danger that the sausage casing will tear along its entire length when the sausage is cut. If tearing of the casings is prevented by previously moistening or cooling the sausage, a considerable part of the sausage material will be pressed out from the cut surface, in an undesirable manner, as a result of the high internal pressure.

Because of the embrittlement of the sausage casing as a result of the loss of plasticizer, the casings are sensitive to impact when sausages of this type are transported.

The above mentioned undesirable properties of cellulose hydrate sausage casings also cannot be avoided when casings are used which contain a proportion of a fat-like chemical crosslinking agent.

SUMMARY OF THE INVENTION

It is an object of the present invention to provide chemically modified cellulose hydrate materials, in particular, films which are useful as packaging material, e.g., for food, especially tubings which are useful as sausage casings, and wherein the disadvantages of prior art cellulose hydrate materials are avoided.

It is a further object of the present invention to provide such a chemically modified cellulose hydrate material, e.g., a sausage casing wherein the desirable properties of cellulose hydrate are retained, but which at the same time exhibit the desirable properties of packaging materials, e.g., sausage casings, which are made from synthetic polymeric material.

It is a further object of the present invention to provide such a chemically modified cellulose hydrate material wherein the desirable properties are retained during its proper use and storage, and can even be improved by watering and/or drying the material in the course of its use.

It is a further object of the present invention to provide such a modified cellulose hydrate material which does not become brittle during use but retains it suppleness during its proper use.

It is yet a further object of the present invention to provide such a chemically modified cellulose hydrate packaging material, particularly a sausage casing, which has a sufficient shrinkability to readily adjust to the shrinkage of its content upon loss of water.

It is still a further object of the present invention to provide such a chemically modified cellulose hydrate material which can be readily destroyed by burning without producing any polluting by-products and which readily undergoes bacterial decomposition.

It is still a further object of the present invention to provide such a chemically modified cellulose hydrate which exhibits a permanent plasticity.

In order to accomplish the foregoing objects according to the present invention, there is provided shaped articles, especially films and tubes which are adapted for packaging food, which include a chemically modified cellulose hydrate and water which comprises:
(a) a chemically modified cellulose hydrate which comprises a reaction product obtainable by reacting a cellulose derivative selected from the group consisting of a cellulose hydrate, an intermediate chemical reaction product of a cellulose hydrate with an alkylamido-bis-dimethylenetriazinone-tetramethylol, an intermediate chemical reaction product of a cellulose hydrate with an alkylaminobis-dimethylene-triazinone-tetramethylol and mixtures thereof, with a synthetic non branched or branched polymer containing recurring oxyalkylene units and at least one terminal N-methylol carbamate group having the formula —CH$_2$—O—CO—NH—CH$_2$—OH, and (b) water.

Optionally, the above composition may further comprise a secondary chemical plasticizer.

According to the present invention, there is further provided a process for preparing the above described shaped articles which comprises the steps of:

(a) treating a shaped article comprising the cellulose derivative in a gel state with an aqueous solution comprising the synthetic polymer to incorporate into the cellulose derivative a plasticity enhancing amount of the synthetic polymer, and (b) heat treating the treated shaped article sufficiently to obtain a dried shaped article comprising the chemically modified cellulose hydrate.

The water content of the shaped article may be further adjusted to provide a desired degree of suppleness thereto, e.g., by moistening with water.

The shaped article which is used as a starting material can be prepared in a conventional manner by introducing a viscose containing solution which optionally may contain an additional chemical agent which is capable of effecting chemical crosslinking of the cellulose hydrate through the shaping orifice of a die into a precipitating liquid to precipitate a shaped article comprising the cellulose derivative in a gel state.

The tube-shaped articles according to the present invention are particularly useful as sausage casings. Accordingly, there is further provided according to the present invention a process for preparing sausages which comprises the step of filling a sausage material into an above described tube-shaped article.

Further objects, features and advantages of the present invention will become apparent from the detailed description of the invention and its preferred embodiments which follow, when considered together with the accompanying figures of drawing.

DETAILED DESCRIPTION OF THE INVENTION

Figure 1:
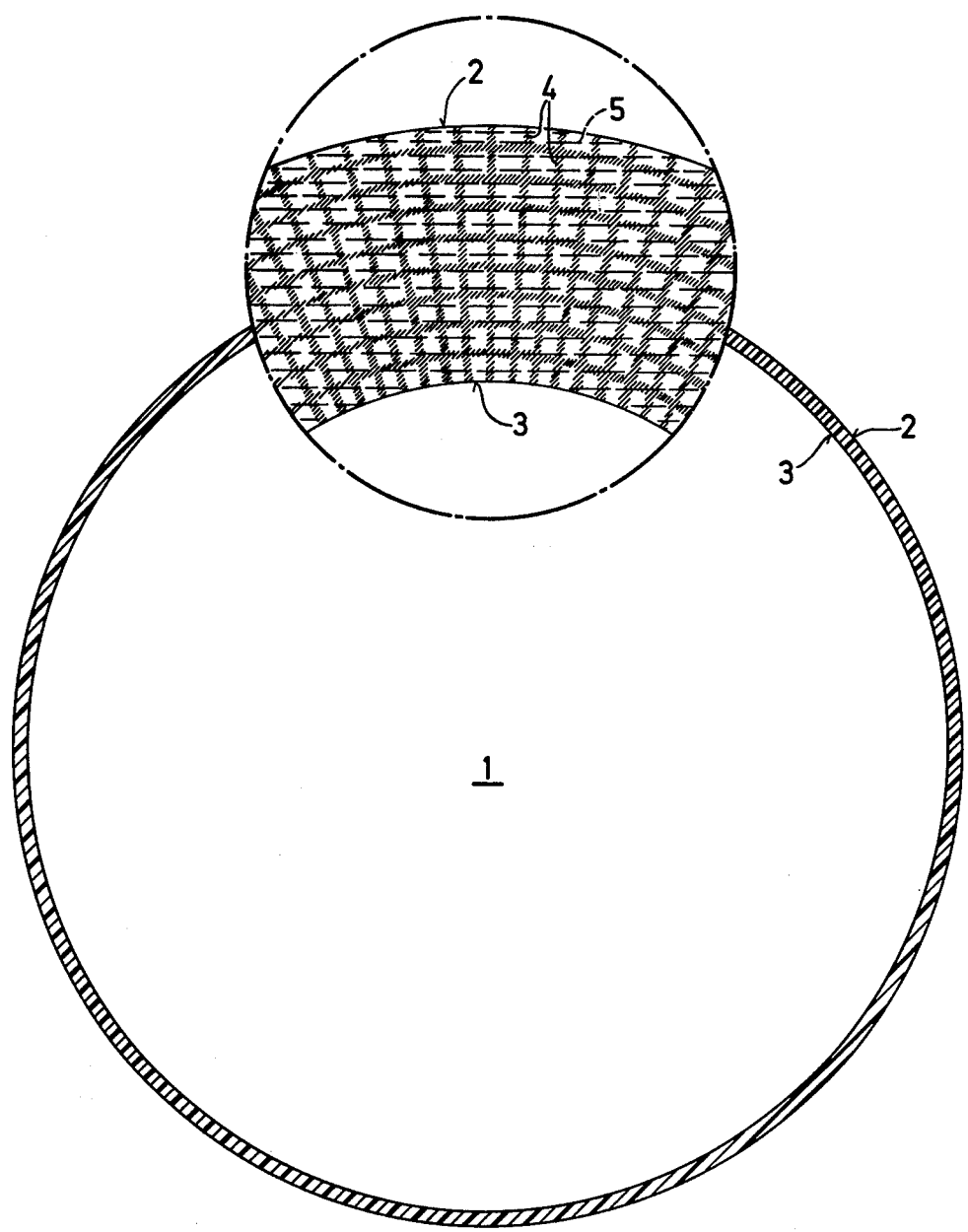
FIG. 1 is a schematic view of a cross-section of a tube-shaped article according to the present invention.

In the shaped articles according to the present invention, the synthetic polymer is bonded to the cellulose hydrate through a chemical bond which is formed by a chemical reaction between the hydroxy groups of the cellulose hydrate and the reactive groups of the synthetic polymer. This reaction takes place at least partially during the treating step (a) of the process according to the present invention, and is completed at the latest, during the heat treatment.

The term "incorporate" within the process step (a) accordingly comprises impregnating the gel with the synthetic polymer, bonding it to the cellulose hydrate by intermolecular forces and forming and effecting at least partial chemical reaction between the cellulose derivative and the synthetic polymer.

According to the present invention, a cellulose hydrate which forms the shaped articles has been partially chemically modified so that the desirable changes in properties which arise during its proper use as a result of watering the articles, e.g., a packaging film or tube, and subsequent drying thereof are retained to an adequate extent but disadvantageous properties, above all, embrittlement of the article, are essentially completely avoided. As a deliberate aim of the present invention, the proposed sausage casings display a shrinkability which is adequate for the intended use and are sufficiently supple to enable sausages which are produced by using these casings to be transported problem-free even when the ambient air has a low relative moisture content, and to be cut without the danger of splitting. Yet, the other desirable known properties of sausage casings made of cellulose hydrate remain unchanged.

The chemically modified cellulose hydrate according to the present invention comprises a reaction product obtainable by reacting the above defined cellulose derivatives with a synthetic polymer containing recurring oxyalkylene units and at least one terminal N-methylol carbamate group.

According to the present invention, the definition "synthetic polymer containing recurring oxyalkylene units and at least one terminal N-methylol carbamate group" is intended to comprise synthetic polymers non-branched and/or branched polymers in the following named "essential" polymers of the following chemical structure:

1. Essential polymers which comprise non-branched polymers, which are obtainable by an addition-polymerization of an alkylene oxide, especially ethylene or propylene oxide, or by an addition-copolymerization of a mixture of ethylene oxide and propylene oxide, and in which at least one terminal "—CH$_2$—OH" group has been converted by chemical reaction into an N-methylol carbamate group of the formula indicated above.

2. Essential polymers which comprise a non-branched copolymer which is obtainable by an addition-copolymerization of a mixture of an alkylene oxide, especially ethylene oxide, propylene oxide or a mixture thereof, with aliphatic and/or aromatic reactive molecules which are capable of undergoing a copolymerization reaction with the alkylene oxide, wherein the chemically reactive groups are an alcoholic OH group, a carboxyl group, a primary amino group or a secondary amino group, and which preferably contains from 1 to about 8 carbon atoms, an in which copolymer at least one terminal "—CH$_2$—OH" group has been converted by chemical reaction into an N-methylol carbamate group of the formula indicated above.

3. Essential polymers which comprise a branched copolymer which is obtainable by an addition-copolymerization of a mixture of an alkylene oxide, especially ethylene oxide, propylene oxide or a mixture thereof, and aliphatic and/or aromatic, at least bifunctional molecules which are capable of undergoing a copolymerization reaction with the alkylene oxide and which each comprise at least two functional groups which are alcoholic OH groups, carboxyl groups, primary amino groups or secondary amino groups having an alkyl group of from 1 to about 8 carbon atoms, and in which copolymer at least one "—CH$_2$—OH" group has been converted into an N-methylol carbamate group of the formula indicated above.

4. Essential polymers which comprise a branched copolymer which can be manufactured by an addition-copolymerization of a mixture of an alkylene oxide, especially ethylene oxide, propylene oxide or a mixture thereof, and aliphatic and/or aromatic, at least bifunctional molecules which are capable of undergoing a copolymerization reaction with the alkylene oxide and which comprise in their molecule chain, at least two chemically different reactive groups, which are selected from alcoholic OH groups, carboxyl groups, primary amino groups and secondary amino groups, having an alkyl group of from 1 to about 8 carbon atoms, and in which copolymers at least one "—$CH_2$—OH" group has been converted into an N-methylol carbamate group of the formula indicated above.

5. The definition "essential polymer" is also intended to comprise mixtures of at least two of the above polymers which differ in their qualitative chemical structure and which have been chemically modified by chemical conversion of at least one "—$CH_2$—OH" group into N-methylol carbamate groups.

Preferred essential polymers are those mentioned above under 1., 2. and 3., and also essential polymer mixtures according to 5.

The above described synthetic "essential" polymer is an essential functional constituent of the chemically modified cellulose hydrate which is the essential component of the material of which the shaped article, according to the present invention, is formed. According to whether a cellulose hydrate, as such, or an "intermediate" chemical reaction product of a cellulose hydrate, is reacted with the synthetic polymer, the resulting chemically modified cellulose hydrate is considered a primary or a secondary chemical reaction product of the starting cellulose hydrate.

The above synthetic "essential" polymer is also an essential starting material in the process according to the present invention in which a cellulose hydrate, or a chemical reaction product of cellulose hydrate and an alkylamido- and/or alkylamino-bis-dimethylene-triazinone-tetramethylol, is chemically reacted with the above synthetic "essential" polymer whereby the chemically modified cellulose hydrate, according to the present invention, is formed as primary or secondary chemical reaction products of the starting cellulose hydrate.

Within the scope of the description of the present invention, the term "shaped article" comprises profiled bodies, such as, for example, fibers, but especially packaging materials, in particular, films, and most preferably tubular casings. The term "tubular casing" also comprises those tubular casings in which a reinforcement of fibrous material, for example, a non-woven fleece, particularly a long-fiber paper fleece, has been incorporated as a matrix into the wall.

"Cellulose hydrate" is understood to be the known product which is formed when a conventional aqueous alkaline viscose solution is brought into contact with an aqueous coagulating liquid, for example, with an aqueous sulfuric acid/sodium sulfate bath, which effects the coagulation of the dissolved constituents in the viscose solution with the chemical regeneration thereof into cellulose hydrate. Depending on the shape which has been imparted to it, the coagulate is capable, after drying, of forming self-supporting shaped structures, such as, fibers, films or tubes. Methods for manufacturing such shaped articles made of coagulated cellulose hydrate in the form of fibers or of tubes with a fiber insert therein are known in the art. For their manufacture, conventional devices are used. In the case of the manufacture of tubes, these devices have an annular slit die through which the viscose solution which is to be coagulated is introduced into a known precipitating liquid whereby it is converted into a tubular form.

Apart from the essential chemically modified cellulose hydrate which may be a primary or a secondary reaction product of a cellulose hydrate, water and, optionally, a secondary chemical plasticizer, the shaped articles according to the present invention essentially do not contain any other chemical substances in any such amounts which are essential for the function of the shaped articles, that is to say, which have a substantial influence on their properties in use.

The "intermediate chemical reaction product" of cellulose hydrate preferably consists of a chemical reaction product which is formed when cellulose hydrate is chemically reacted with, preferably, 10% by weight, relative to the weight of cellulose hydrate, of an alkylamido- and/or alkylamino-bis-dimethylene-triazinone-tetramethylol, wherein the number of carbon atoms in the alkyl group is in the range of from about 9 to about 24, preferably in the range of from about 14 to about 19, and most preferably, is 17.

The water content of the shaped article is in the range of between about 5 and about 25% by weight, and preferably in the range of between about 8 and about 12% by weight, relative to the total weight of the shaped article. Shaped articles which contain a secondary plasticizer and/or wherein the chemically modified cellulose hydrate is a secondary chemical reaction product can also have a substantially lower water content, for example, a water content of about 4% by weight, relative to their total weight, without this having any influence on the desired properties in use of the shaped article.

In addition to a chemically modified cellulose hydrate, according to the present invention, which is a primary chemical reaction product of the cellulose hydrate, preferably the shaped articles contain water in an amount of between about 8 and about 18% by weight, relative to their total weight, and a secondary plasticizer in an amount of between about 1 and about 35% by weight, advantageously of between about 4 and about 18% by weight, in each case, relative to the total weight of the shaped article, and also, optionally, a second chemically modified cellulose hydrate according to the present invention which is a secondary chemical reaction product of the cellulose hydrate reaction product in an amount of between about 1 and about 35% by weight, relative to the chemically modified cellulose hydrate.

The terminal N-methylol carbamate groups containing synthetic "essential" polymers, which are used as starting materials can be prepared according to conventional methods.

The chemical reaction, with the aid of which "$CH_2$—OH" end groups of chemical compounds can be converted into N-methylol carbamate groups, comprises several reaction steps each of which are known and are not part of the present invention.

The three-step chemical reaction sequence by means of which it is possible to convert OH groups in chemical compounds into N-methylol carbamate groups is known. The manufacture of polyglycol (1000)-bis-carbamide-bis-N,N'-methylol from polyglycol (1000) will be described below by way of example.

The OH groups in other chemical compounds having terminal "—CH$_2$—OH" groups can be converted into N-methylol carbamate groups in an analogous manner.

First Reaction Step:

Phosgenation of polyglycol:

1000 g (1 mol) of polyglycol having a molecular weight of 1000 are introduced into a 2 l stirred flask and heated therein. As soon the polyglycol has melted (45° C), 220 g (2.2 mols) of phosgene are introduced into the melt while cooling the flask with water.

The introduction of phosgene is effected over a total time of about 2 hours.

After one third (about 70 g) of the total amount of phosgene has been passed into the warmed melt, the temperature of the melt is kept at 35° to 40° C until the introduction is completed.

Dry nitrogen is then passed through the reaction product in the flask, at a temperature of 30° to 35° C for about 2 hours.

Subsequently, the reaction mass is kept under a degree of vacuum which conventionally is applied in the laboratory for a period of about 4 hours.

Analytical data of a sample of the phosgenation product (polyglycol bis-chlorocarbonate):

Chlorine content: total 6.0 to 7.3% (theory 6.3%)
Yield: 1,125 g (theory 1,125 g)

The product which is prepared in the first reaction step is designated as (A) below.

Second Reaction Step:

Amidation of the polyglycol bis-chlorocarbonate prepared in the first reaction step:

960 g (1.2 l) of isobutanol are introduced into a 4 l flask and the liquid is then saturated with about 20 g of ammonia.

A total of 1,120 g of the phosgenation product (A) (in the liquid state), corresponding to 1 mol of polyglycol bis-chlorocarbonate, are added dropwise at a uniform rate, in the course of a period of 3 to 4 hours to the liquid, which has a temperature of 20 to 30° C, while stirring.

At the same time, about 70 g of gaseous ammonia are passed into the liquid so that there is always an excess of ammonia in the reaction vessel.

The liquid in the reaction vessel is then heated to 90 to 95° C whereupon excess ammonia escapes from the liquid, and ammonium chloride which has precipitated (about 110 g) is filtered off from the liquid by means of a filter, for example, a Seitz pressure filter.

The filter residue is washed with 120 g (150 ml) of isobutanol at a temperature of 80° to 90° C.

The filtrate is freed from isobutanol under a degree of vacuum which is conventionally applied in the laboratory. At the end of the operation, a vacuum of a water-jet vacuum pump is applied at a temperature of the liquid of 100° C.

Analytical data of a sample of the polyglycol bis-carbamide prepared in the second reaction step:

Nitrogen content: total 2.4 to 2.8%
Yield: 1,050 g (theory 1,086 g)

The polyglycol bis-carbamide manufactured in the second reaction step is designated as (B) below.

Third Reaction Step:

Reaction of product (B) with formaldehyde:

1,050 g of product (B) (corresponding to 1 mol of polyglycol (1000) bis-carbamide) are introduced into a reaction vessel, and 250 g of water and 150 g of an aqueous 40% formalin solution (2 mols of formaldehyde) are added, while stirring.

The reaction mixture is then heated slowly to a temperature of 65° to 70° C while continuously adding saturated sodium carbonate solution in order to always maintain a pH value in the liquid of 8 to 9. The total amount of sodium carbonate solution added is 60 ml.

After the sodium carbonate solution has been added, the liquid is stirred for a further hour at a temperature of 65° to 70° C. The yield of the end product in this third reaction step, that is to say polyglycol (1000) bis-carbamide-bis-N,N'-methylol, is 1,500 g. The end product is obtained in an aqueous solution.

The first reaction step is described in the textbook "Methoden der organishem Chemie" ("Methods of organic chemistry"), Houben-Weyl, volumn VIII, page 138 (1952). The second reaction step is known from the same textbook, volume VIII, pages 101 to 104. The third reaction step is known from "Kunststoff-Hanbuch" (Plastics handbook"), Carl-HanserVerlag, Munich, 1968, volumn X, pages 153 to 227.

According to a preferred embodiment of the present invention, the shaped articles comprise a chemically modified cellulose hydrate which is a reaction product obtainable by reacting a cellulose hydrate or the intermediate chemical reaction product with a synthetic "essential" polymer which contains two or more than two terminal N-methylol carbamate groups.

The synthetic "essential" polymers are chemically reactive and because of the chemical structure of the basic polymers, are able to exert a plasticizing action. Chemical reactivity, on the one hand, and the ability to act as a plasticizer, on the other hand, characterize the "essential" polymers as chemical agents capable of imparting a permanent plasticizing effect. This is because the agent which is capable of imparting a permanent plasticizing effect is firmly bonded in the shaped article by a covalent chemical bond to cellulose hydrate molecules and/or the intermediate chemical reaction product of the cellulose hydrate and is thus substantially resistent to extraction by water from the "essential" polymer or the shaped article which is substantially formed by the "essential" polymer.

Preferred "essential" polymers are those wherein the basic polymers are polymers which are obtainable by addition polymeriziation of ethylene oxide or propylene oxide or by addition-copolymerization of a mixture of chemical compounds capable of undergoing addition-copolymerization comprising ethylene oxide, propylene oxide, or an ethylene oxide/propylene oxide mixture, wherein the ethylene oxide/propylene oxide ratio suitably is from about 90:10 to about 10:90, and which preferably comprises a predominant proportion of ethylene oxide, and at least one of the following chemical compounds:

(a) aliphatic mono- and/or poly-alcohols and/or aromatic mono- or poly-alcohols,
(b) aliphatic mono- and/or poly-amines and/or aromatic amines,
(c) aliphatic mono- or poly-carboxylic acids and/or aromatic mono- or poly-carboxylic acids, (d) aliphatic hydroxycarboxylic acids,
(e) aliphatic hydroxyamines or
(f) mixtures of the chemical substances mentioned under (a) to (e).

Reactive chemical compounds which are especially suitable for a copolymerization reaction with an alkylene oxide, for the preparation of the corresponding basic polymers, are cited below:

Aliphatic mono-alcohols with 1 to 18 carbon atoms and preferably 2 to 12 carbon atoms, especially ethanol, butanol, n-propanol, isopropanol, hexyl alcohol, cetyl alcohol and also stearyl alcohol and lauryl alcohol.

Aromatic alcohols, such as benzyl alcohol and phenylethyl alcohol.

Diols, especially aliphatic diols, which are particularly suitable are: ethane-diol, propane-diol and butane-diol.

Polyols, and especially aliphatic polyols, which are particularly suitable are: glycerol, pentaerythritol or hexitols, such as sorbitol, mannitol and dulcitol, glucose and sucrose.

Particularly suitable aliphatic monocarboxylic acids are acetic acid, propionic acid, butyric acid, valeric acid, capric acid, caprylic acid, palmintic acid and stearic acid.

Particularly suitable polyvalent carboxylic acids are oxalic acid, malonic acid, succinic acid, glutaric acid, adipic acid and pimelic acid.

Particularly suitable aromatic carboxylic acids are benzoic acid, phenylacetic acid, benzilic acid and mandelic acid.

Particularly suitable aromatic polyvalent carboxylic acids are phthalic acid, isophthalic acid, terephthalic acid and mellitic acid.

Particularly suitable hydroxycarboxylic acids are lactic acid, monohydroxysuccinic acid and dihydroxysuccinic acid, tartronic acid, mesoxalic acid and citric acid.

Particularly suitable aminocarboxylic acids are glycocoll, aminopropionic acid, aminovaleric acid and aminocapronic acid.

Particularly suitable amines are, in particular, aliphatic diamines which have a carbon chain containing from 1 to about 6 carbon atoms, such as, ethylendiamine and hexamethylenediamine.

A suitable hydroxyamine is, for example, 1-hydroxy-6-aminohexane.

Preferred "essential" polymers, which contain two or more than two terminal N-methylol carbamate groups in the molecule are those wherein the basic polymers are polymers which are obtainable by an addition-copolymerization of a mixture comprising ethylene oxide, propylene oxide, or a mixture thereof, and at least one polyol having 2 to 6 carbon atoms, such as, glycerol, diglycerol, trimethylolmethane, pentaerythritol and at least one amine having 2 to 6 carbon atoms, such as, triethanolamine, ethylenediamine, diethylenetriamine and triethylenetetramine. The former basic polymers advantageously comprise one ethylene oxide or propylene oxide unit per OH group and in the latter basic polymers, up to 50 and preferably up to 20, ethylene oxide and/or propylene oxide units can be present per active hydrogen in the hydroxylamino and secondary amino groups.

Particularly suitable basic polymers are polyglycols, such as, in particular, a polyethylene glycol of the general formula $$HO-(-CH_2-CH_2-O-)_n-CH_2-CH_2-OH$$

in which $n$ is an integer in the range of between 1 and about 120, and preferably in the range of between about 50 and about 60. Especially suitable polyethylene glycols are diglycol, triglycol, polyethylene glycol 200 and polyethylene glycol 1000. Suitable polypropylene glycols are those having the general formula $$HO-(-CH_2-CH_2-CH_2-O-)_n-CH_2-CH_2-CH_2-OH$$

in which $n$ is an integer in the range of between 1 and about 120, and preferably in the range of between about 50 and about 60.

Particularly advantageous chemical compounds which are capable of undergoing a copolymerization reaction and are at least bifunctional are listed below by their formula, in which $w$ represents an integer in the range of from about 1 to about 50, and preferably in the range of from about 1 to about 20:

$HOCH_2CH(OH)CH_2OH$ $HOCH_2CH(OH)CH_2OCH_2CH_2OH$ $HOCH_2CH_2OCH_2CH(OH)CH_2OCH_2CH_2OH$ $HOCH_2CH(OH)CH_2OCH_2CH(OH)CH_3$ $CH_3CH(OH)CH_2OCH_2CH(OH)CH_2OCH_2CH(OH)CH_3$ $HOCH_2CH_2OCH_2CH(OH)CH_2OCH_2CH(OH)CH_3$ $HOCH_2CH(OH)CH_2OCH_2CH(OH)CH_2OH$ $HOCH_2CH_2OCH_2CH(OH)CH_2OCH_2CH(OH)CH_2OH$ $HOCH_2CH_2OCH_2CH(OH)CH_2OCH_2CH(OH)CH_2OCH_2CH_2OH$ $CH_3CH(OH)CH_2OCH_2CH(OH)CH_2OCH_2CH(OH)CH_2OH$ $CH_3CH(OH)CH_2OCH_2CH(OH)CH_2OCH_2CH(OH)CH_2OCH_2CH(OH)CH_2$ $HOCH_2CH_2OCH_2CH(OH)CH_2OCH_2CH(OH)CH_2OCH_2CH(OH)CH_3$ $$\begin{array}{l} HOCH_2CHCH_2OH \\ \phantom{HOCH_2}| \\ \phantom{HOCH_2}CH_2OH \end{array}$$

$$\begin{array}{l} HOCH_2CHCH_2OCH_2CH_2OH \\ \phantom{HOCH_2}| \\ \phantom{HOCH_2}CH_2OH \end{array}$$

$$\begin{array}{l} HOCH_2CHCH_2OCH_2CH_2OH \\ \phantom{HOCH_2}| \\ \phantom{HOCH_2}CH_2OCH_2CH_2OH \end{array}$$

$$\begin{array}{l} HOCH_2CH_2OCH_2CHCH_2OCH_2CH_2OH \\ \phantom{HOCH_2CH_2OCH_2}| \\ \phantom{HOCH_2CH_2OCH_2}CH_2OCH_2CH_2OH \end{array}$$

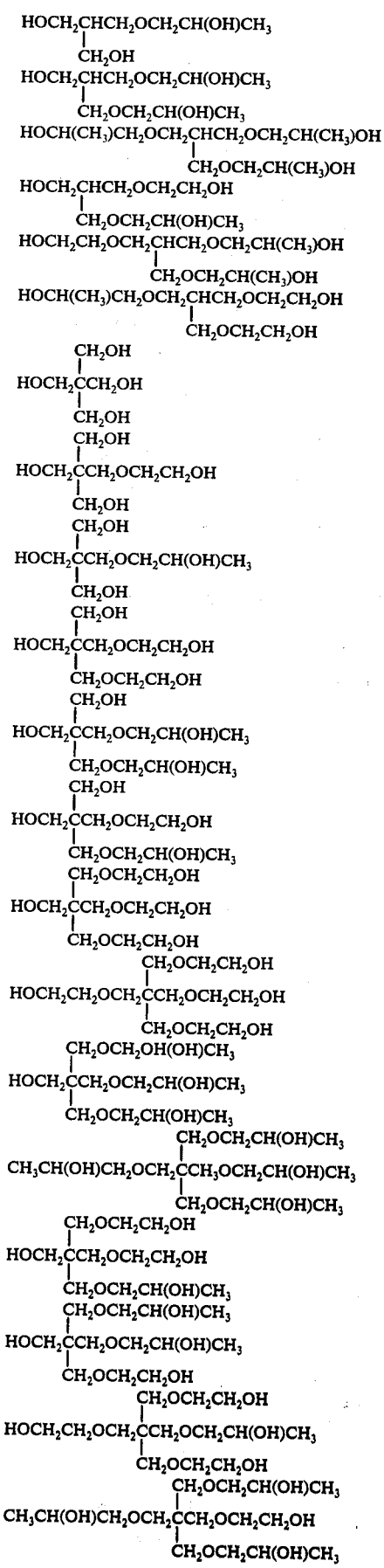

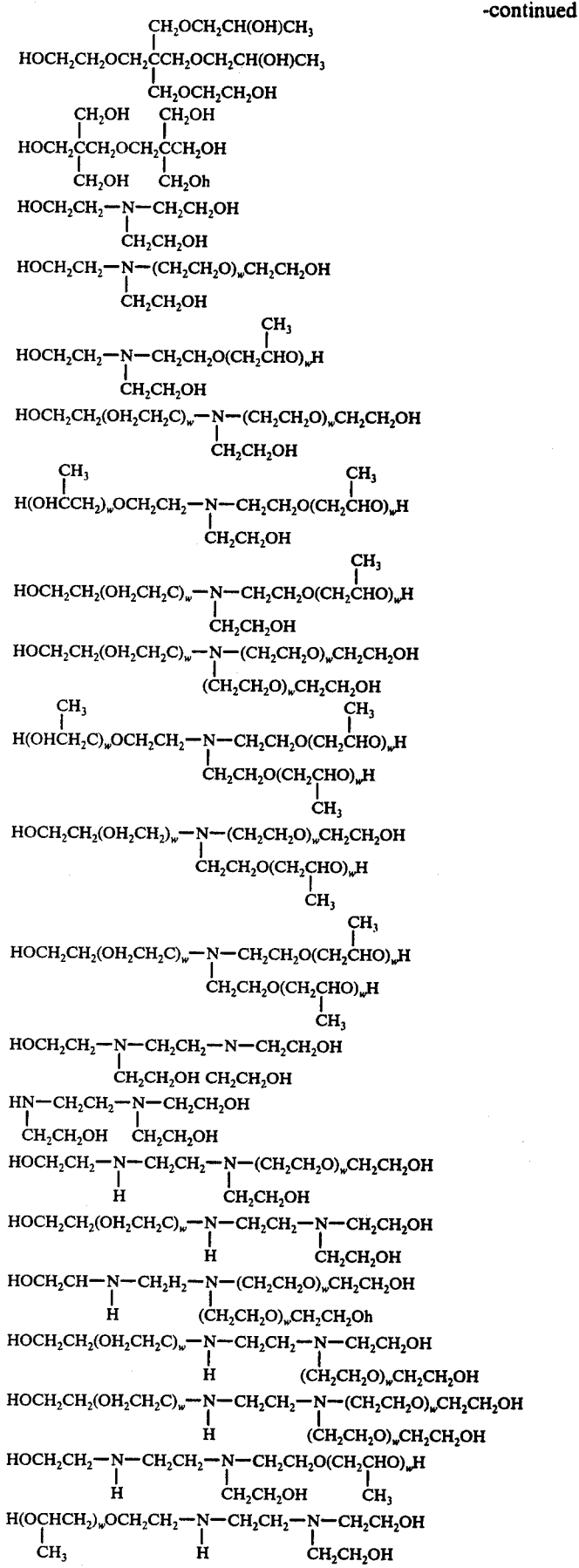

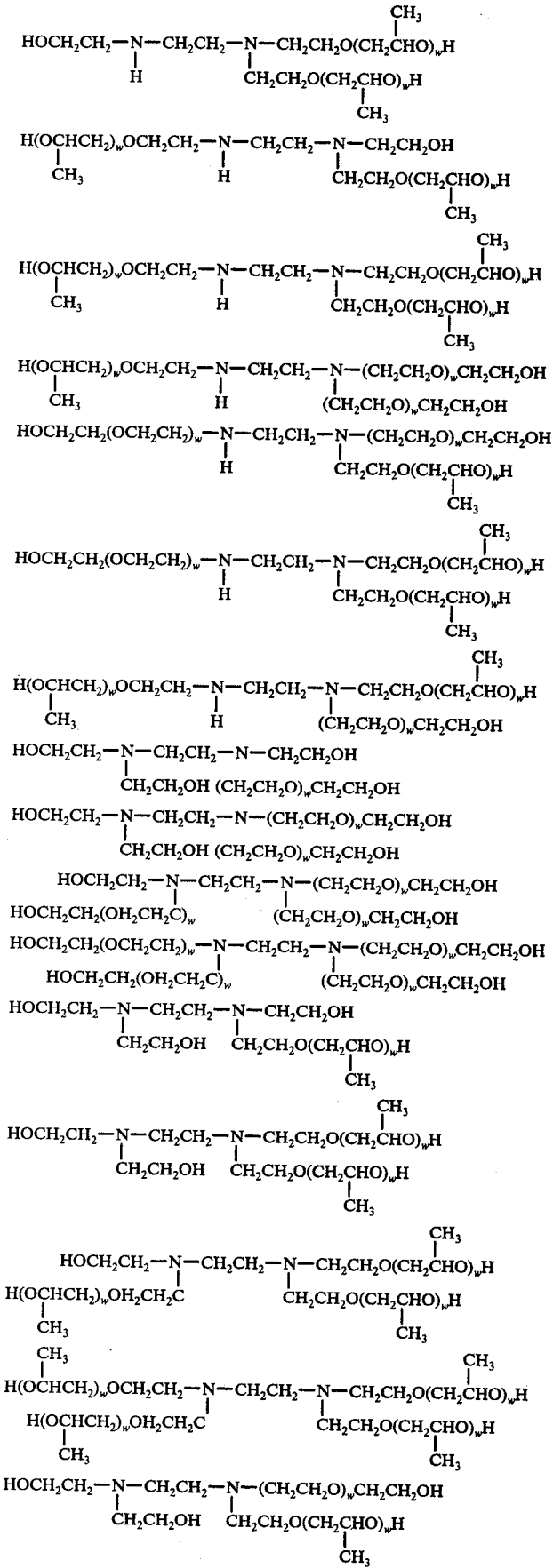

-continued

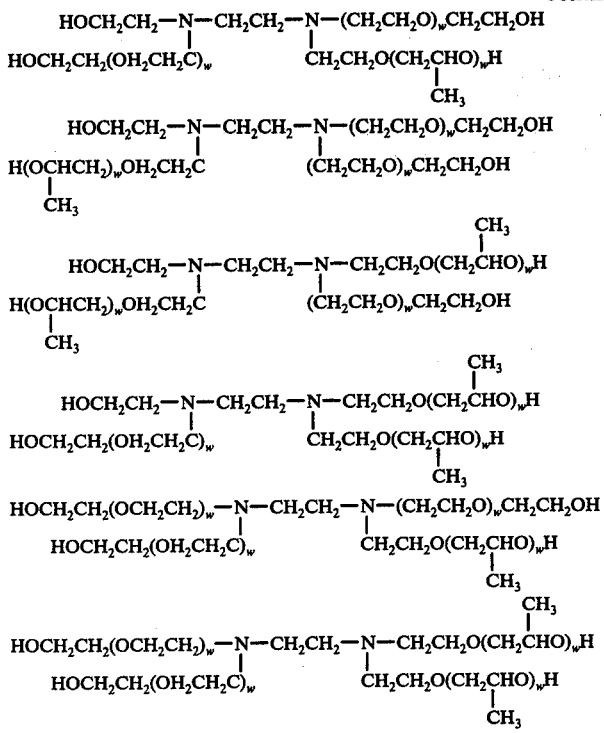

and

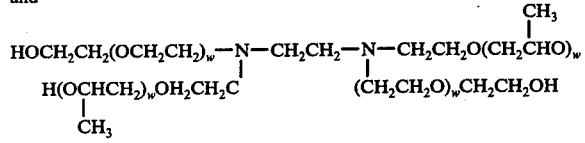

The molecular weight of the "essential" polymers is in the range of between about 200 and about 6,000, and preferably in the range of between about 600 and about 2,500; "essential" polymers are water-soluble, the molecular weight of which is within the above indicated range.

"Essential" polymers which have two terminal N-methylol carbamate groups, and which are non-branched and have a molecular weight in the range of from about 800 to about 2,500, are particularly advantageous.

The term "non-branched" is intended to denote that the molecule chain of the basic polymer does not have a side chain which carries a reactive OH group.

"Essential" polymers which have more than two terminal N-methylol carbamate groups, and which comprise branched basic polymers, preferably have a molecular weight in the range of between about 600 and about 1,800. Preferred "essential" polymers of this type comprise basic polymers which are obtainable by an addition-copolymerization of an alkylene oxide, preferably ethylene oxide, and an aliphatic chemical compound which is capable of undergoing a polymerization reaction with this alkylene oxide and which comprises more than two reactive groups, especially OH groups per molecule, for example, glycerol, trimethylolpropane, pentaerythritol, sucrose and the like.

The "essential" polymer is formed from this basic polymer by the conversion of more than two of its terminal "—CH$_2$-OH" groups into N-methylol carbamate groups.

Within the scope of the present invention, the term "secondary chemical plasticizers" is to be understood as chemical compounds which, when they are incorporated in a shaped article as a result of their chemical properties and their molecular structure, are capable of excerting a plasticizing effect on the latter.

In this context, secondary chemical plasticizers are characterized in that they are not bonded to the essential component of the shaped article by a covalent chemical bond but only by intermolecular forces (so called "external" plasticizing effect). For the aforementioned reasons these plasticizers are extractable by water from the shaped article, contrary to the permanent plasticizers.

Suitable secondary chemical plasticizers are, for example, glycerol, glycol or polyglycol. The use of these substances as a chemical plasticizer is known.

Cellulose hydrate which has been plasticized by means of chemical substances which are firmly bonded thereto by a chemical bond due to the plasticizing effect thereof, which is a result of their chemical and physical structure, will be designated "internally" plasticized cellulose hydrate.

In addition to the chemically modified cellulose hydrate which can be prepared by reacting cellulose hydrate with an "essential" polymer and/or by reacting an intermediate chemical product of cellulose hydrate with an "essential" polymer, and water which are the functionally essential constituents of the shaped articles and are present in predominant amounts therein, the shaped articles according to the present invention may optionally also contain an additional secondary chemical plasticizer. The chemical components within the shaped articles are physically and substantially uniformly distributed in the latter.

Because of its chemical composition and molecular structure, an alkylamido- or alkylamino-bis-dimethylene-triazinone-tetramethylol, from which an intermediate chemical reaction product of the cellulose hydrate can be obtained, wherein the alkyl group contains from about 9 to about 24, preferably from about 14 to about 19, and most preferably, 17, carbon atoms, is able to imply a plasticizing effect to the final product. Because of the reactive methylol groups in the triazinone-tetramethylol- molecule, it is capable of a chemical reaction. Such intermediate chemical reaction products which are obtainable by a chemical reaction of cellulose hydrate with an alkylamido- or alkylamino-bis-dimethylene-triazinone-tetramethylol, and their preparation, are known from the Belgium Pat. No. 823,410, the disclosure of which is hereby incorporated by reference. These compounds are, as such, not the subject of the present invention.

According to a particularly preferred embodiment of the invention, the shaped articles comprise the following chemical substances:

1. A chemically modified cellulose hydrate which comprises a reaction product obtainable by a chemical reaction of a cellulose hydrate with an "essential" polymer having at least two terminal N-methylol carbamate groups, for example, polyethylene glycol di-N-methylol carbamate, wherein the basic polymer has a molecular weight of from about 200 to about 1,000.

2. Water, and

3. A secondary chemical plasticizer, for example, glycerol, glycol or polyglycol.

According to another preferred embodiment of the present invention, the chemically qualitative structure of the shaped article differs from the above mentioned embodiment in that in addition to the above chemical components, the shaped article also contains a second chemically modified cellulose hydrate which is a secondary reaction product of the cellulose hydrate which is obtainable by a chemical reaction of cellulose hydrate with stearylamido- or stearylamino-bis-dimethylene-triazinone-tetramethylol and subsequent chemical reaction of the resulting intermediate compound with an "essential" polymer which has at least two terminal N-methylol carbamate groups and wherein the basic polymer is a polymer which can be manufactured by an addition-polymerization of ethylene oxide.

The "essential" polymer is obtainable from the basic polymer by conversion of the two terminal "—CH$_2$—OH" groups in the latter into N-methylol carbamate groups of the formula indicated above.

When an alkylene oxide molecule undergoes an addition-copolymerization with a chemical aliphatic or aromatic compound which contains one or more OH, NH$_2$, secondary amino, or carboxyl group, and is capable of undergoing a polymerization reaction with the alkylene oxide, the latter compound is added to the alkylene oxide by splitting the ring of the alkylene oxide molecule and forming an OH group.

The further polymerization of alkylene oxide molecules then takes place in such a manner that the OH group, which has been formed by the addition reaction of the original alkylene oxide molecule, in turn is added to a further alkylene oxide molecule, whereby the ring of this molecule is split. This reaction continues with the formation of a molecule chain of ethylene oxide units. The end group of the resulting molecule chain is necessarily formed by a reactive OH group. The addition reaction of alkylene oxide molecules to chemical compounds which have several OH groups in the molecule proceeds correspondingly and leads to basic polymers which have a molecule chain consisting of a plurality of alkylene oxide units, and wherein the molecule chain always comprises a terminal OH group.

The structural arrangement of the various components in the shaped articles is explained, by way of example, in a simplified and schematic representation in the drawings, wherein the figures represent possible variants of the shaped articles.

FIG. 1 shows, schematically, a cross-section of the structure of a tube 1, 2 and 3 comprising chemically modified cellulose hydrate 4 and water 5.

Figure 2:
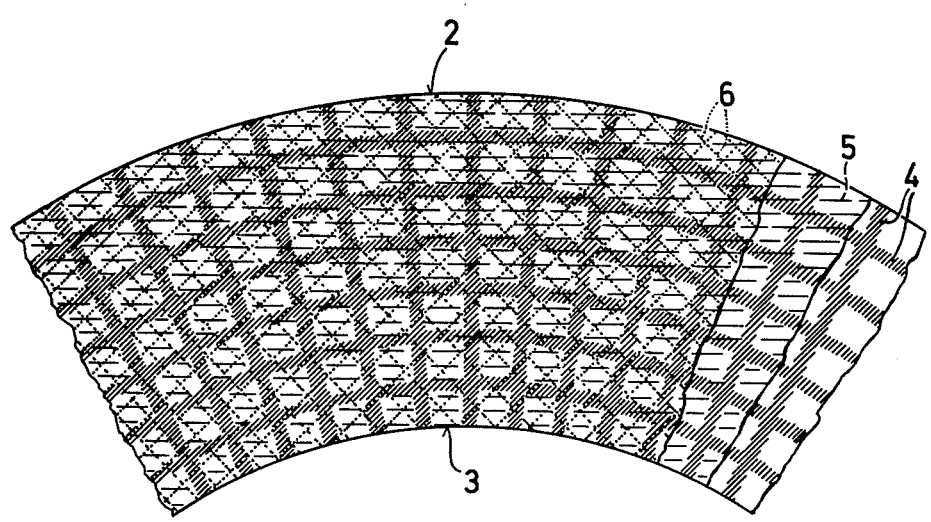
FIG. 2 is a schematic view of a partial cross-section of a tube-shaped article according to the present invention.

FIG. 2 is a schematic representation of a cross-section showing the structure of a tube comprising the following components: chemically modified cellulose 4, water 5 and secondary plasticizer 6.

Figure 3:
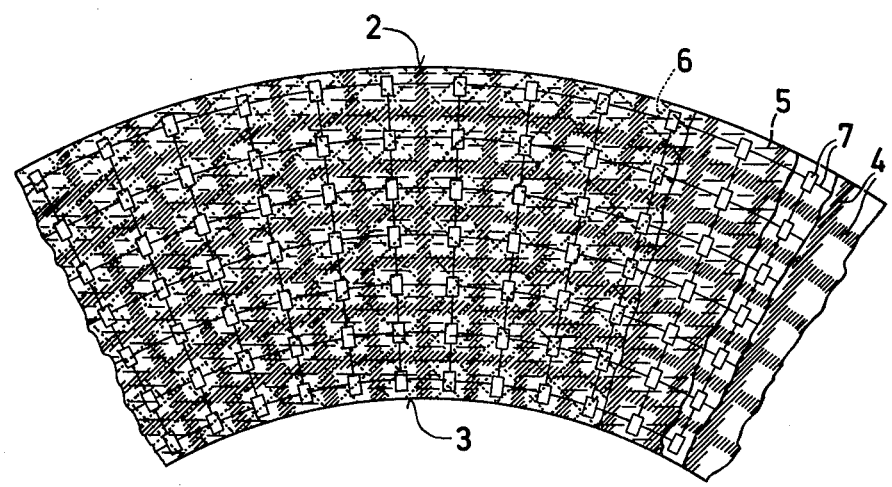
FIG. 3 is a schematic view of a partial cross-section of a tube-shaped article according to the present invention.

FIG. 3 is a schematic representation of a cross-section showing the structure of a tube, the components of which are a chemically modified cellulose hydrate which is a primary chemical reaction product of cellulose hydrate 4, water 5, a secondary plasticizer 6 and a second chemically modified cellulose hydrate which is a secondary chemical reaction product of the cellulose hydrate 7. In order to better indicate the separate, graphic symbols of the components, these components are shown in a staggered sequence in the right-hand region of FIGS. 2 and 3.

In FIG. 1, 1 denotes the tube cavity, 2 denotes the outer side of the tube, 3 denotes the inner side of the tube which faces towards the tube cavity, 4 denotes a chemically modified cellulose hydrate and 5 denotes water.

In FIG. 2, the numbers 1, 2, 3, 4 and 5 have the same meaning as in FIG. 1. 6 denotes a secondary plasticizer.

In FIG. 3, the numbers 1–6 have the same meaning as in FIGS. 1 and 2. 7 denotes a second chemically modified cellulose hydrate.

The tube is formed from the chemical components 4 and 5 or 4, 5 and 6 or 4, 5, 6 and 7 and in each case these components are present as a uniform mixture. Accordingly, the wall of the tube is not made of several layers of material arranged on top of one another but consists of a homogeneous mixture of the chemical components.

The present invention also relates to a process for the preparation of shaped articles, especially tubeshaped articles whch comprise a chemically modified cellulose hydrate and which optionally contain a secondary chemical plasticizer. In such a process, an aqueous alkaline viscose solution, which optionally contains reactive chemical compounds which have the ability to act as plasticizers, is pressed through the shaping orifice of a die body into a precipitating bath and the resulting shaped article is washed and then dried. According to the process of the present invention, a viscose solution or a viscose solution which additionally contains a chemical agent which is capable of effecting chemical crosslinking of the cellulose hydrate is pressed through the shaping orifice of a die body into a precipitating bath to form a shaped article. Then, an aqueous solution of a synthetic, non-branched and/or branched polymer which contains recurring oxyalkylene units and has at least one terminal N-methylol carbamate group of the general formula

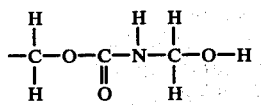

is allowed to act on the before formed shaped article which is in the gel state. The solution may optionally contain an additional secondary chemical plasticizer. Then, the shaped article is sufficiently heated and dried and, subsequently to the drying, the shaped article, e.g., the tubes, are optionally moistened with water and brought to a predetermined water content.

In order to manufacture a tube-shaped article, the solution is pressed through the annular slit of a die body into the precipitating liquid.

The aqueous solution containing the synthetic polymer is abbreviated to "polymer solution" below.

The process will be illustrated below using the manufacture of a shaped article in tubular form by way of example.

The viscose solution used is a solution which has, for example, the following characteristics: cellulose content 7% by weight, alkali content 5.8% by weight, each relative to the total weight of the solution, γ-value 29.4; NaCl ripeness 2.5; viscosity 137 seconds by the falling ball method (at 20° C).

Through the annular slit of a die body, the alkaline viscose solution is pressed continuously in the shape of a tube into the precipitating liquid, for example, an aqueous solution which contains sulfuric acid and a salt of sulfuric acid dissolved therein.

The tubular body which is formed by the precipitation process comprises cellulose hydrate which, after being treated with the precipitant, is in the gel state, that is to say, its water content is at least 270% by weight, relative to the total weight of the tube.

The tube is then washed, for example, by treating it with water, for example, by continuously feeding the tube through a vat which is filled with washing water.

The preparation of cellulose hydrate tubes in their gel state is known.

An aqueous solution of an "essential" polymer having a molecular weight in the range of from about 600 to about 2,500, for example, polyethylene glycol di-N-methylol carbamate with a molecular weight of 1,000, is then allowed to act on the cellulose hydrate tube in the gel state.

Suitable "essential" polymers are those which have been described in more detail above.

The aqueous solution of the "essential" polymer suitably contains the latter in an amount in the range of between about 5 and about 30% by weight, preferably in an amount in the range of between about 8 and about 20% by weight, for example, in an amount of 12% by weight, relative to the total weight of the polymer solution.

The polymer solution suitably has a pH value in the range of from about 1 to about 5, and preferably a pH value in the range of from about 1.5 to about 3, for example, a pH value of 2.5.

The pH value is adjusted by adding an appropriate amount of an acid, for example, by adding an appropriate amount of sulfuric acid, to the polymer solution The temperature of the aqueous polymer solution during the treatment of the shaped article is advantageously in the range of between about 20° and about 90° C, preferably in the range of between about 40° and about 80° C, and is, for example, about 60° C.

The aqueous polymer solution suitably contains a chemical substance which is able to act as a catalyst and is capable of accelerating the chemical reaction between the reactive groups of the dissolved "essential" polymer and the reactive groups of cellulose hydrate. The polymer solution may contain an amount of the catalyst in the range of between about 5 and about 50 g/l of the polymer solution, preferably an amount in the range of between about 10 and about 20 g/l of the polymer solution, and, for example, in an amount of 15 g/l of the polymer solution.

All the water-soluble salts which are known as catalysts and which accelerate the said chemical reaction, for example, inorganic salts of a strong acid, such as, hydrochloric acid and a weak base, e.g., $MgCl_2$ or $NH_4Cl$, are suitable.

The amounts of chemical catalyst which are present in the final product obtained by the process according to the present invention are so small that they do not exert any discernible influence on the properties in the use of the resulting product.

The treatment of the cellulose hydrate tube in its gel state with the aqueous polymer solution is effected, for example, by allowing the polymer solution to act continuously on the tube by feeding the tube at a constant speed through a vat which is filled with this solution.

The period of time during which the tube stays in the polymer solution is adjusted in such a way that it corresponds to a reaction period of from about 120 minutes to about 30 seconds, and especially from about 30 minutes to about 1 minute, for example, about 5 minutes.

After the polymer solution has acted on the tube, the latter is heated to a temperature in the range of between about 70° and 140° C, and preferably in the range of between about 90 and about 120° C, for example, to a temperature of 110° C, whereby a high temperature is always associated with a short heating period.

The tube may be subjected to the heat by, for example, feeding the tube continuously at a constant speed through a drying channel of suitable length, for example, a channel 50 m in length, which is charged with hot air of the appropriate temperature. The residence time in the drying channel is in the range of from about one half a minute to about 20 minutes, depending on the speed at which the tube moves in the direction of the longitudinal axis. This speed suitably is in the range of from about 5 to about 30 m/minute.

While it is subjected to the action of heat, the tube is in a distended form which is effected by means of supporting air inside the tube.

The supporting air is introduced into the tube before the drying of the latter is started; the tube is fed through a squeezing gap of a first pair of rollers before it is introduced into the drying channel and is fed through the squeezing gap of a second pair of rollers after it leaves the drying channel.

The tube is dried to a sufficiently large degree by the action of heat and then has a water content in the range of about 3 to about 10% by weight, relative to the total weight of the tube.

An advantageous modification of the process consists in using an aqueous polymer solution which contains, in addition to the dissolved polymer, a secondary chemical plasticizer, for example, glycerol, in a ratio of 10:1 to 1:10 to act on the tube in the gel state during the course of the process. Solutions of this type are prepared by adding the suitable amount of a secondary chemical plasticizer, for example, the above mentioned plasticizer, to the polymer solution.

After drying has been effected, the tube is advantageously brought to a water content of, for example, 10% by weight, relative to the total weight of the tube, by moistening with water.

The action of heat which leads to the drying of the tube at the same time, has the result that the chemical reaction between the reactive OH groups of the cellulose hydrate or the reactive groups of the intermediate chemical reaction products of cellulose hydrate and the terminal N-methylol carbamate groups of the "essential" polymer takes place sufficiently rapidly and nearly quantitatively.

In order to carry out an embodiment of the process according to which the viscose solution contains a bifunctional chemical agent capable of chemically crosslinking the cellulose hydrate, a viscose solution which contains an alkylamido- or alkylamino-bis-dimethylene-triazinone-tetramethylol wherein the alkyl group contains from about 9 to about 24, preferably from about 14 to about 19, advantageously 17, carbon atoms, is used as the starting material. The viscose solution contains said chemical compound capable of effecting chemical crosslinking in, for example, an amount of about 10% by weight, relative to the cellulose content of the solution.

A viscose solution which contains stearylamido-bis-dimethylene-triazinone-tetramethylol as the chemical crosslinking agent is preferred.

It is also possible for the viscose solution to contain a mixture of stearylamido-bis-dimethylene-triazinon-tetramethylol and stearylamino-bis-dimethylene-triazinon-tetramethylol.

The viscose solution containing the chemical crosslinking agent is prepared, for example, by mixing 29.2 g of a 24% by weight aqueous solution of, for example, stearylamido-bis-dimethylene-triazinon-tetramethylol with 1,000 g of the viscose solution having the above mentioned characteristics.

The preparation of viscose solutions containing an alkylamido- or alkylamino-bis-dimethylene-triazinon-tetramethylol is known, as is the preparation of tubes from these solutions. The tubes may, for example, be prepared according to the methods which are described in the German Offenlegungsschriften No. 2,362,551 and No. 2,241,689, the disclose of which is hereby incorporated by reference.

Aqueous solutions of all of those "essential" polymers within the scope of the present invention, which are cited above, can be used for carrying out the process according to the invention by both variants.

The process according to the present invention permits the modification of shaped articles of cellulose hydrate, especially tubes, in a simple manner, without changing the customary manufacturing conditions and without using additional process steps.

Compared with shaped articles which are made of chemically modified cellulose which are manufactured according to known processes, the shaped articles according to the present invention which are obtainable by the process according to the present invention, especially the tubes which are obtainable by this process, are improved with regard to quite a number of properties. These improvements are of advantage in particular in the case that the tubes, after their inner side has been coated with a coating which is impermeable to water vapor, are used as synthetic sausage casings.

As a result of the specific chemical composition of the shaped articles and of the specific chemical structure of the materials of which they are formed, the shaped articles are distinguished by special properties.

Because of the specific chemical structure of the shaped articles, especially the tubes, practically no embrittlement resulting from the loss of chemical secondary plasticizer during the manufacture of the sausage by preparatory watering of the sausage casings and hot water or hot steam treatment of the sausage, which otherwise is unavoidable in the case of known tubes based on cellulose hydrate is observed.

The values for the elongation and resistance to further tearing of tubes manufactured according to the present invention are so high that the sausages which are manufactured using tubes of this type as the sausage casing can be cut without bursting.

Any compacting of the walls of the tube-shaped articles when these are watered is resisted by the bulky chemical substances which are chemically bonded to the cellulose hydrate molecules. As a result, the shrinkage and thus, the internal pressure of sausages which have a sausage casing consisting of a tube manufactured by the process according to the present invention are also considerably reduced. The result of this is that the extent to which the sausage material is forced out after the sausage has been cut is considerably reduced.

If particularly preferred tubes containing a secondary chemical plasticizer are used as synthetic sausage casings, sausages which have a casing which lies flush with the filling material are formed by causing all or part of the secondary plasticizer to be extracted from the casing by measures during sausage manufacture, so that, as a result of the shrinkage of the casing which is thus effected, the latter lies flush and wrinkle-free on the filling material in a desirable manner. A considerable advantage of the tubes which can be manufactured according to the process is that the other properties of the cellulose hydrate in casings which are used as a synthetic sausage skin are retained because the chemical modification of the cellulose hydrate is carried out only after the molecular structure of the cellulose hydrate which is responsible for these properties has already formed.

Accordingly, shaped articles according to the present invention, especially tubes, have the advantage over known tubes in that they display the advantageous properties of cellulose hydrate tubes, but do not have their disadvantages.

Accordingly, the shaped articles according to the present invention, especially tubes, are characterized by the combination of properties of natural polymers on the one hand and of synthetic polymers on the other hand.

EXAMPLE 1

A flat laid cellulose hydrate tube - diameter, caliber 60, which has been prepared from a viscose solution as is described above, and which further contains a paper fiber insert in its walls, and wherein the tube-forming cellulose hydrate is in the gel state (water content 320% by weight, relative to the total weight) is guided at a constant speed of 10 m/minute through a vat which is filled with a liquid of the following composition: 12% by weight of polyethylene glycol di-N-methylol carbamate, wherein the polyethylene glycol base polymer, which can be manufactured by a polymerization reaction of ethylene oxide, has a molecular weight of 200, 8% by weight of glycerol and 80% by weight of water.

The pH value of the aqueous solution of the above mentioned composition is adjusted to 2.2 by adding an appropriate amount of sulfuric acid and the solution is used at a temperature of 70° C.

Then, the tube is passed horizontally and in the direction of its longitudinal axis, at a speed of 10 m/minute through a drying channel which is operated with warm air, and wherein the tube is distended by introducing supporting air into its cavity. The temperature is 90° C at the channel inlet and 120° C at the channel outlet. Thus, the tube is dried to such an extent that it has a water content of about 3 to 4% by weight, relative to its total weight, after leaving the drying channel.

The passing of the tube through the drying channel wherein it is distended by means of supporting air in its cavity, is effected by first passing the flat laid tube through the gap of a first pair of squeezing rollers before it enters into the drying channel; after the tube emerges from the drying channel it is passed through the gap of a second pair of squeezing rollers. At the start of the process operation, supporting air is introduced into the cavity of the tube piece between the two pairs of squeezing rollers and this air then always keeps the above mentioned region of the tube in the distended state during the subsequent process operation.

The water content of the tube is then adjusted to 10% by weight, relative to its total weight, by moistening with water.

Since, however, the tube requires a special coating on its inside for its intended use as a synthetic sausage casing, it is usually appropriate to provide the inside of the tube with such a coating after the treatment with the above mentioned solution, but before passing the tube through the drying channel. According to this embodiment, the tube is first provided with a layer of a chemical anchoring agent which consists of an epichlorohydrin-polyamine-polyamide resin as is disclosed in the British Patent Specification No. 1,417,419, the disclosure of which is hereby incorporated by reference. The chemical anchoring agent is applied in the form of an aqueous solution thereof, for example, a 10% weight solution thereof, to the inside of the tube, and the volatile agent in the layer is then evaporated by the action of heat on the tube, whereby the pre-anchoring layer is formed on the inside of the tube. Subsequently, an aqueous dispersion, for example, an 8% by weight aqueous dispersion, of a copolymer which comprises 88% by weight of vinylidene chloride, 2% by weight of acrylic acid and 10% by weight of ethyl methacrylate, is applied to the pre-coated inside of the tube. The tube is then heated to a temperature of 100° C by passing it through a drying channel which is heated to the corresponding temperature.

Thereby, the aqueous dispersing agent is driven from the liquid layer on the inside of the tube whereby a polymeric film coating is formed on the inside of the tube; at the same time, the tube is dried to a water content of about 6% by weight, relative to its total weight, by this action of heat. The water content of the dried tube is then adjusted to 10% by weight, relative to its total weight, by moistening with water.

The process for applying an inner coating to the cellulose hydrate tube is known from the British Patent No. 1,201,830, the disclosure of which is hereby incorporated by reference. The manufacture of cellulose hydrate tubes which comprise an internal adhesion-promoting coating of a chemical polymer is known from the British Patent No. 1,417,419. Therefore, details relating to these processes are not described within the present specification.

A sample piece of a tube which is manufactured as described above, is placed in water at room temperature for 30 minutes and after the sample piece has been removed from the liquid, water adhering externally to the sample piece is removed by blotting with absorbent paper. The following characteristics have been determined on samples of the piece of tube which has been prepared as indicated above, and the test results are given in the Table below:

| Characteristics | Comparative tube* | Tube manufactured according to the present invention |
| --- | --- | --- |
| Bursting pressure, m of water column | 11.5 | 10.6 |
| Elongation at the bursting point, percent | 4.4 | 5.6 |
| Longitudinal breaking length, m | 3,400 | 3,350 |
| Transverse breaking length, m | 3,000 | 3,100 |
| Longitudinal elongation at break, percent | 30 | 30 |
| Transverse elongation at break, percent | 36 | 38 |
| Weight per m², g | 108 | 116 |
| Shrinkage | | 45% (less than the comparative tube) |

*A tube which does not contain a polymer based on an alkylene oxide which is firmly bonded to the cellulose hydrate and has at least one methylol carbamate group.

Another sample piece of the tube manufactured as indicated above, is watered for 20 minutes in hot water at 80° C; the sample piece is then dried. The water content of the dried sample is 4% by weight, relative to the total weight of the sample piece.

A weight comparison with a cellulose hydrate tube which originally contained 25% by weight of a secondary plasticizer (comparison tube) and which has been extracted with hot water in the same way, shows that the tube manufactured according to the process contains 16% by weight of material components which are chemically bonded to the cellulose hydrate.

EXAMPLE 2

A tube is prepared as is described in Example 1, except that instead of the alkaline viscose solution, an alkaline viscose solution which additionally contains 10% by weight of stearylamido-bis-dimethylene-triazinon-tetramethylol, relative to cellulose is used as a starting material and this solution is pressed through the slit of the shaping die into the precipitant bath. Then the aqueous polymer solution according to Example 1 is reacted with the starting tube-shaped article which results from the precipitation. The other process parameters are those indicated in Example 1.

The values for the corresponding characteristics which are listed in the Table which follows are determined under the same conditions as indicated in Example 1.

| Characteristics | Comparative tube* | Tube manufactured according to the present invention |
|---|---|---|
| Bursting pressure, m of water column | 11.5 | 11.4 |
| Elongation at the bursting point, percent | 4.4 | 5.5 |
| Longitudinal breaking length, m | 3,400 | 3,250 |
| Transverse breaking length, m | 3,000 | 3,000 |
| Longitudinal elongation at break, percent | 30 | 30 |
| Transverse elongation at break, percent | 36 | 36 |
| Weight per m², g | 108 | 114 |
| Shrinkage | | 45% (less than that of the comparative tube) |

*See footnote under table on page 51

The amount of chemical agent firmly bonded to cellulose hydrate, which is determined as indicated in Example 1, is 14% by weight, relative to a cellulose hydrate tube which originally contained 25% by weight of a secondary plasticizer in the form of glycerin.

After removal of the secondary plasticizer (by extraction with hot water), the tube manufactured according to the process of the present invention is so supple that, when it is used as a synthetic sausage casing, the sausages can be cut without splitting of the casing even when the casing is tightly filled to capacity with sausage material and a relative moisture content of up to 30%.

EXAMPLE 3

A tube is prepared as is described in Example 1, except that the liquid with which the starting tube is treated has the following composition: 12% by weight of polyethylene glycol di-N-methylol carbamate, the polyethylene glycol base polymer having a molecular weight of 1,000, 8% by weight of glycerin and 80% by weight of water.

The properties of the resulting tube are as follows:

| Characteristics | Comparative tube* | Tube manufactured according to the present invention |
|---|---|---|
| Bursting pressure, m of water column | 12.0 | 10.0 |
| Elongation at the bursting point, % | 6.6 | 5.6 |
| Longitudinal breaking length, m | 3,550 | 3,575 |
| Transverse breaking length, m | 3,200 | 2,675 |
| Longitudinal elongation at break, percent | 28 | 28 |
| Transverse elongation at break, percent | 30 | 32 |
| Weight per m², g | 106 | 112 |
| Shrinkage | | 35% (less than that of the comparative tube) |

*A tube which does not contain a polymer based on an alkylene oxide which is firmly bonded to the cellulose hydrate and has at least one methylol carbamate group.

Amount of chemical agent which is firmly bonded to the cellulose hydrate: 18% by weight, relative to a cellulose hydrate tube which originally contained 25% by weight of a secondary plasticizer in the form of glycerin.

Sausages which are manufactured with casings of the above mentioned type are not susceptible to bursting and splitting when they are cut, even with a relatively low moisture content (20 to 40%). On cutting, the sausage material is not pressed out of the casing at the cut surface.

EXAMPLE 4

A tube is prepared as is described in Example 3, but with the modification that a starting tube corresponding to Example 2 is used as the starting tube.

Amount of chemical constituent firmly incorporated in the tube: 20% by weight, relative to a cellulose hydrate tube which originally contained 25% by weight of a secondary plasticizer in the form of glycerin.

The shrinkage of the tube is: 45% less than that of the above mentioned comparison tube.

EXAMPLE 5

A tube is prepared as described in Example 1, except that the hot liquid having a temperature of 70° C, with which the starting tube is treated, has the following composition: 12% by weight of propoxylated butanediol di-N-methylol carbamate with a molecular weight of 1,600, 8% by weight of glycerol and 80% by weight of water.

EXAMPLE 6

A tube is prepared as is described in Example 1, but with the modification that the hot liquid having a temperature of 70° C with which the starting tube is treated, has the following composition: 12% by weight of ethoxylated hexamethylenediamino-di-N-methylol carbamate with a molecular weight of 1,200, 8% by weight of glycerin and 80% by weight of water.

EXAMPLE 7

A tube is prepared as is described in Example 1, but with the modification that the hot liquid having a temperature of 70° C with which the starting tube is treated, has the following composition: 12% by weight of ethoxylated pentaerythritol di-N-methylol carbamate with a molecular weight of 1,500, 8% by weight of glycerin and 80% by weight of water.

EXAMPLES 8-10

A tube is prepared as is described in Example 2, but with the modification that the composition of the liquid with which the starting tube is treated corresponds to that of Example 5 or of Example 6, or that of Example 7, respectively.

What is claimed is:

1. A shaped article comprising
   (a) a chemically modified cellulose hydrate obtained by reacting a cellulose derivative selected from the group consisting of cellulose hydrate, a chemical reaction product of cellulose hydrate with an alkylamido-bis-dimethylene-triazinone-tetramethylol, a chemical reaction product of cellulose hydrate with an alkylamino-bis-dimethylene-triazinone-tetramethylol and mixtures thereof, with a synthetic polymer containing recurring oxyalkylene units and at least one terminal N-methylol carbamate group having the formula

 and (b) water.
2. The shaped article as defined in claim 1 which further comprises a plasticizer.

3. The shaped article as defined in claim 2 wherein the synthetic polymer has a molecular weight in the range of from about 200 to about 6000.

4. The shaped article as defined in claim 2 wherein the plasticizer is selected from the group consisting of glycerine, glycol and polyglycol.

5. The shaped article as defined in claim 2 which comprises 1 to 35% by weight of plasticizer.

6. The shaped article as defined in claim 1 shaped as a film or a tube.

7. The shaped article as defined in claim 6 adapted for food packaging.

8. The shaped article as is defined in claim 7, in the form of a sausage casing.

9. The shaped article as defined in claim 1, wherein the synthetic polymer is a non-branched polyalkylene oxide polymer obtained by addition polymerization of a lower alkylene oxide.

10. The shaped article as defined in claim 9 wherein the alkylene oxide is selected from the group consisting of ethylene oxide, propylene oxide and mixtures thereof.

11. The shaped article as defined in claim 1 wherein the synthetic polymer comprises two terminal N-methylol carbamate groups of the formula

12. The shaped article as defined in claim 11 wherein the synthetic polymer is selected from the group consisting of polyethylene glycol-200 di-N-methylol-carbamate and polyethylene glycol-1000 di-N-methylol-carbamate.

13. The shaped article as defined in claim 1 wherein the synthetic polymer comprises a copolymer obtained by addition-copolymerization of alkylene oxide and an aliphatic compound copolymerizable therewith and containing a reactive group selected from the group consisting of hydroxy, carboxy, primary amino, and secondary amino.

14. The shaped article as defined in claim 13 wherein the copolymerizable aliphatic compounds have from 2 to 8 carbon atoms.

15. The shaped article as defined in claim 13 wherein the copolymerizable aliphatic compound contains two of said reactive groups.

16. The shaped article as defined in claim 15 wherein the synthetic polymer comprises two terminal N-methylol carbamate groups of the formula

17. The shaped article as defined in claim 15 wherein the alkylene oxide is selected from the group consisting of ethylene oxide, propylene oxide and mixtures thereof.

18. The shaped article as defined in claim 17 wherein the copolymerizable aliphatic compound is selected from the group consisting of hexamethylene diamine, glycol and butanediol.

19. The shaped article as defined in claim 18 wherein the synthetic polymer has a molecular weight in the range of from about 800 to about 2500.

20. The shaped article as defined in claim 1 wherein the synthetic polymer comprises a copolymer obtained by addition-copolymerization of at least one alkylene oxide and at least one aromatic compound copolymerizable therewith and containing at least one reactive group selected from the group consisting of hydroxy, carboxy, primary amino, and secondary amino.

21. The shaped article as defined in claim 1 wherein the synthetic polymer comprises a copolymer obtained by addition-copolymerization of at least one alkylene oxide and an aliphatic compound copolymerizable therewith and containing at least three reactive groups selected from the group consisting of hydroxy, carboxyl, primary amino and secondary amino.

22. The shaped article as defined in claim 21 wherein the synthetic polymer comprises a polymer obtained by addition-copolymerization of alkylene oxide selected from the group consisting of ethylene oxide, propylene oxide, and mixtures thereof, with a compound selected from the group consisting of glycerol, pentaerythritol, mannitol, sorbitol, dulcitol or sucrose, and wherein at least three terminal OH groups have been converted into N-methylol carbamate groups.

23. The shaped article as defined in claim 21 wherein the synthetic polymer has a molecular weight of between about 600 and about 1800.

24. The shaped article as defined in claim 1 wherein the water content is between about 4 and about 25% by weight.

25. The shaped article as defined in claim 1 wherein the synthetic polymer is resistent to extraction by water.

26. The shaped article as defined in claim 1 which further comprises a water impermeable polymer coating on its inner side.

27. The shaped article as defined in claim 1 which further comprises a reinforcement of a fibrous material therein.

28. A process for preparing the shaped article as defined in claim 1 which comprises the steps of
 (a) treating a shaped article comprising the cellulose derivative in a gel state with an aqueous solution of the synthetic polymer to incorporate into the cellulose derivative a plasticity enhancing amount of the synthetic polymer
 (b) heat treating the treated shaped article to obtain a dried shaped article comprising the chemically modified cellulose hydrate.

29. The process as defined in claim 28 which further comprises the step of adjusting the water content of the dried shaped article.

30. The process as defined in claim 28 which further comprises the step of introducing viscose containing solution through the shaping orifice of a die into a precipitating liquid to precipitate a shaped article comprising the cellulose derivative in a gel state.

31. The process as defined in claim 30 wherein the viscose containing solution further comprises a chemical agent which is capable of effecting chemical crosslinking of the cellulose hydrate selected from the group consisting of alkylamido-bis-dimethylene-triazinone-tetramethylol and alkylamino-bis-dimethylene-triazinone-tetramethylol.

32. The process as defined in claim 31 wherein the chemical agent which is capable of effecting chemical crosslinking of the cellulose hydrate is selected from the group consisting of stearylamido-bis-dimethylene-triazinone-tetramethylol and stearylamino-bis-dimethylene-triazinone-tetramethylol.

33. The process as defined in claim 28 which further comprises washing the precipitated shaped article prior to treating it with the aqueous solution comprising the synthetic polymer.

34. The process as defined in claim 28 which comprises adjusting the water content of the shaped article by moistening it with water.

35. The process as defined in claim 28 which comprises to impart to the shaped article a water content of between 4 and about 25% by weight.

36. The process as defined in claim 28 wherein the shaped article comprising the cellulose derivative in a gel state is a tube-shaped article.

37. The process as defined in claim 28 wherein the aqueous solution comprising the synthetic polymer further comprises a plasticizer.

38. The process as defined in claim 37 wherein the plasticizer is selected from the group consisting of glycerine and water soluble polyols.

39. The process as defined in claim 38 wherein the synthetic polymer has a molecular weight of from about 200 to about 6000.

40. The process as defined in claim 28 wherein the aqueous solution comprising the synthetic polymer further comprises a water soluble catalytically active inorganic salt.

41. The process as defined in claim 28 wherein the aqueous solution comprises between about 5 to about 30% of the synthetic polymer solution.

42. The process as defined in claim 28 wherein the pH value of the aqueous solution is between about 1 and about 5.

43. The process as defined in claim 28 wherein the aqueous solution has a temperature of between about 20° and about 90° C.

44. The process as defined in claim 28 wherein the heat treating step is effected at a temperature of between about 70° and about 140° C.

45. The process as defined in claim 44 wherein the heat treating is effected during a period of from about 30 seconds to about 20 minutes.

46. The process as defined in claim 45 wherein the water content of the heat treated shaped article is from about 3 to about 10% by weight.

47. The process as defined in claim 28 wherein the synthetic polymer comprises recurring oxyethylene units and two terminal —CH$_2$-O-CO-NH-CH$_2$-OH groups.

48. The process as defined in claim 28 wherein the synthetic polymer comprises recurring oxypropylene units and two terminal—CH$_2$-O-CO-NH-CH$_2$-OH groups.

49. The process as defined in claim 28 wherein the synthetic polymer comprises two terminal

—CH$_2$-O-CO-CH$_2$-OH groups and a copolymer obtained by addition copolymerization of an alkylene oxide selected from the group consisting of ethylene oxide, propylene oxide and mixtures thereof and an aliphatic compound copolymerizable therewith containing two reactive groups selected from the group consisting of hydroxy, carboxyl, primary amino or secondary amino.

50. The process as defined in claim 49 wherein the aliphatic copolymerizable compound is selected from the group consisting of diols and diamines.

51. The process as defined in claim 49 wherein the aliphatic compound is selected from the group consisting of glycerine, propanediol, butanediol, ethylene diamine, and hexamethylene diamine.

52. The process as defined in claim 28 wherein the synthetic polymer comprises at least three terminal —CH$_2$O-CO-CH$_2$-OH groups and a copolymer obtained by addition copolymerization of an alkylene oxide selected from the group consisting of ethylene oxide, propylene oxide and mixtures thereof and an aliphatic polyol copolymerizable therewith.

53. The process as defined in claim 52 wherein the polyol is selected from the group consisting of glycerine, pentaerythritol, mannitol, sorbitol, dulcitol, sucrose and polyethylene glycol of the general formula OH-(-CH$_2$-CH$_2$-O-)$_n$-CH$_2$-CH$_2$-OH wherein $n$ is an integer of from 1 to 5, and preferably 1 to 3.

54. The process as defined in claim 28 wherein the synthetic polymer has two terminal N-methylolcarbamate groups, and comprises a polyethylene glycol of the general formula HO-(CH$_2$-CH$_2$-O-)$_n$-CH$_2$-CH$_2$-OH wherein $n$ is an integer of from 1 to about 120 wherein two terminal OH groups have been converted into N-methylol carbamate groups.

55. The process as defined in claim 54 wherein $n$ is an integer of from about 50 to about 60.

56. The process as defined in claim 54 wherein the polyethylene glycol is selected from the group consisting of diglycol, triglycol, polyethylene glycol 200, and polyethylene glycol 1000.

57. The process as defined in claim 28 wherein the synthetic polymer has two terminal N-methylol carbamate groups and comprises a polypropylene glycol of the general formula HO—(-CH$_2$-CH$_2$-CH$_2$-O)$_n$-CH$_2$-CH$_2$-CH$_2$—OH wherein $n$ is an integer of from 1 to about 120 wherein two terminal OH groups have been converted into N-methylol carbamate groups.

58. The process as defined in claim 57 wherein $n$ is an integer of from about 50 to about 60.

59. The process as defined in claim 26 which further comprises the step of applying to the tube shaped article an inner layer of a water vapor permeable polymer coating.

60. A method of preparing sausages which comprises the step of filling a sausage material into a tube-shaped article as defined in claim 1.

* * * * *

UNITED STATES PATENT OFFICE
CERTIFICATE OF CORRECTION

Patent No. 4,097,963      Dated July 4, 1978

Inventor(s) Klaus-Dieter HAMMER et al.

It is certified that error appears in the above-identified patent and that said Letters Patent are hereby corrected as shown below:

In Column 3, line 5, kindly delete "—CH-";

In Column 3, line 6, kindly insert at the beginning of the line -- —CH --; (i.e., to read as follows:

$CH_2$—O—CO—NH—$CH_2$—OH, and).

UNITED STATES PATENT OFFICE
CERTIFICATE OF CORRECTION

Patent No. 4,097,963   Dated July 4, 1978

Inventor(s) Klaus-Dieter HAMMER et al.

It is certified that error appears in the above-identified patent and that said Letters Patent are hereby corrected as shown below:

IN THE SPECIFICATIONS

In Column 4, line 52, kindly delete "an in" and insert instead -- and --.

In Column 8, line 22, kindly delete "organishem" and insert instead -- organischen --.

In Column 8, line 23, kindly delete "volumn" and insert instead -- Volume --.

In Column 8, lines 26/27, kindly delete "Han-buch" and insert instead -- Handbuch --.

In Column 8, line 28, kindly delete "volumn" and insert instead -- Volume --.

In Column 10, lines 51 and 52, kindly delete formula 11, "$CH_3CH(OH)CH_2OCH_2CH(OH)CH_2OCH_2CH(OH)CH_2OCH_2CH(OH)CH_2$" and insert instead

-- $CH_3CH(OH)CH_2OCH_2CH(OH)CH_2OCH_2-CH(OH)CH_2OCH_2CH(OH)CH_3$ --.

UNITED STATES PATENT OFFICE
CERTIFICATE OF CORRECTION

Patent No. 4,097,963　　　　　Dated July 4, 1978

Inventor(s) Klaus-Dieter HAMMER et al.

It is certified that error appears in the above-identified patent and that said Letters Patent are hereby corrected as shown below:

In Column 11, 16th formula, kindly delete

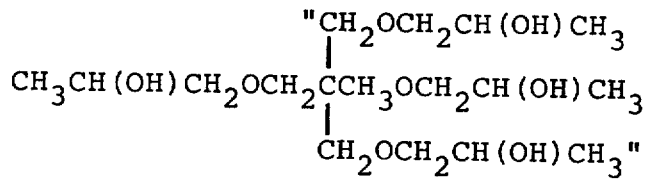

and insert instead

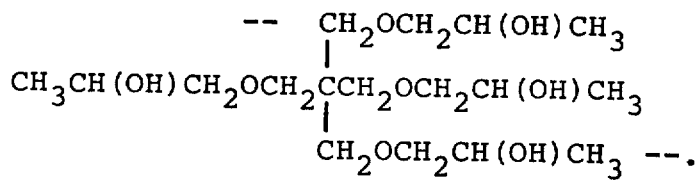

In Column 13, 2nd formula, kindly delete

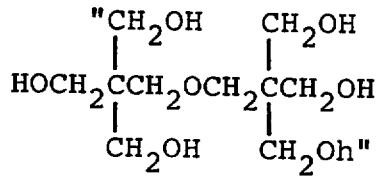

and insert instead

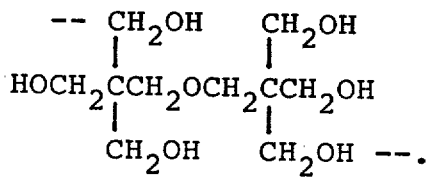

UNITED STATES PATENT OFFICE
CERTIFICATE OF CORRECTION

Patent No. 4,097,963  Dated July 4, 1978

Inventor(s) Klaus-Dieter HAMMER et al.

It is certified that error appears in the above-identified patent and that said Letters Patent are hereby corrected as shown below:

In Column 13, 11th formula, kindly delete

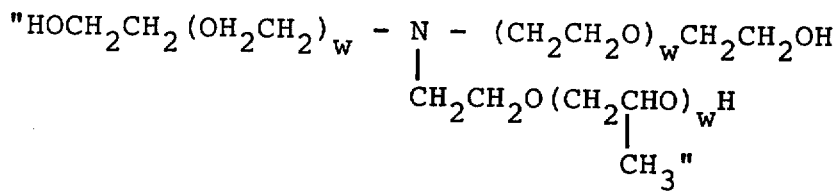

and insert instead

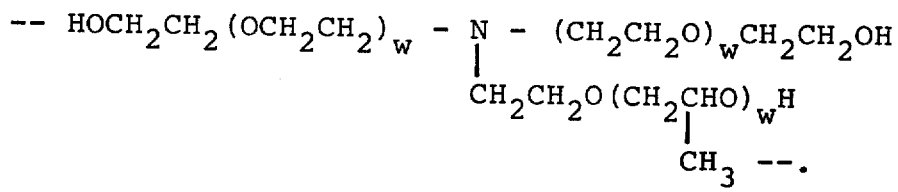

In Column 13, 12th formula, kindly delete

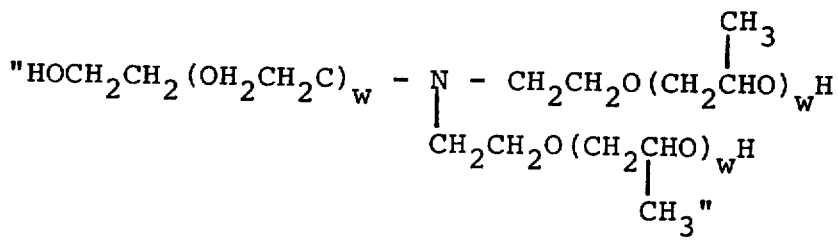

and insert instead

UNITED STATES PATENT OFFICE
CERTIFICATE OF CORRECTION

Patent No. 4,097,963     Dated July 4, 1978

Inventor(s) Klaus-Dieter HAMMER et al.

It is certified that error appears in the above-identified patent and that said Letters Patent are hereby corrected as shown below:

--
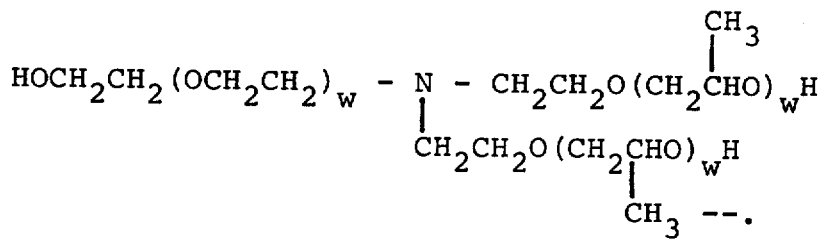
--.

In Column 13, 13th formula, kindly delete

"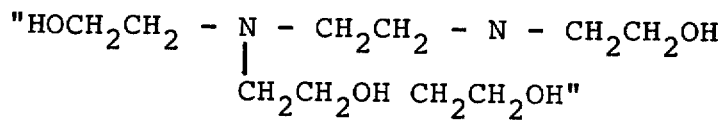"

and insert instead

-- 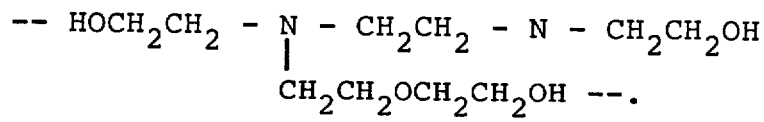 --.

In Column 13, 17th formula, kindly delete

"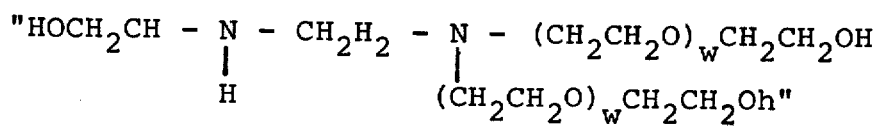"

and insert instead

UNITED STATES PATENT OFFICE
CERTIFICATE OF CORRECTION

Patent No. 4,097,963      Dated July 4, 1978

Inventor(s) Klaus-Dieter HAMMER et al.

It is certified that error appears in the above-identified patent and that said Letters Patent are hereby corrected as shown below:

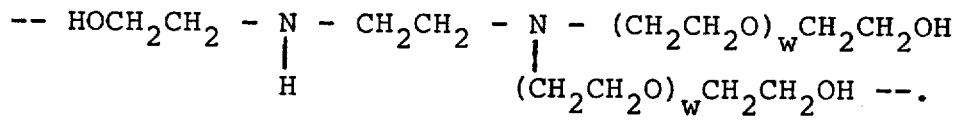

In Column 20, line 51, kindly delete "whch" and insert instead -- which --.

In Column 23, line 49, kindly delete "disclose" and insert instead -- disclosure --.

In Column 27, line 18, kindly delete "on page 51" and insert instead -- in column 26 --.

In Column 27, line 30, kindly delete "and a" and insert instead -- and at a --.

Signed and Sealed this

Thirty-first Day of July 1979

[SEAL]

Attest:

Attesting Officer

LUTRELLE F. PARKER
Acting Commissioner of Patents and Trademarks